Nov. 10, 1931.  J. STADTHERR  1,830,772
ATTACHMENT FOR CORN PICKER ROLLS
Filed Feb. 23, 1927
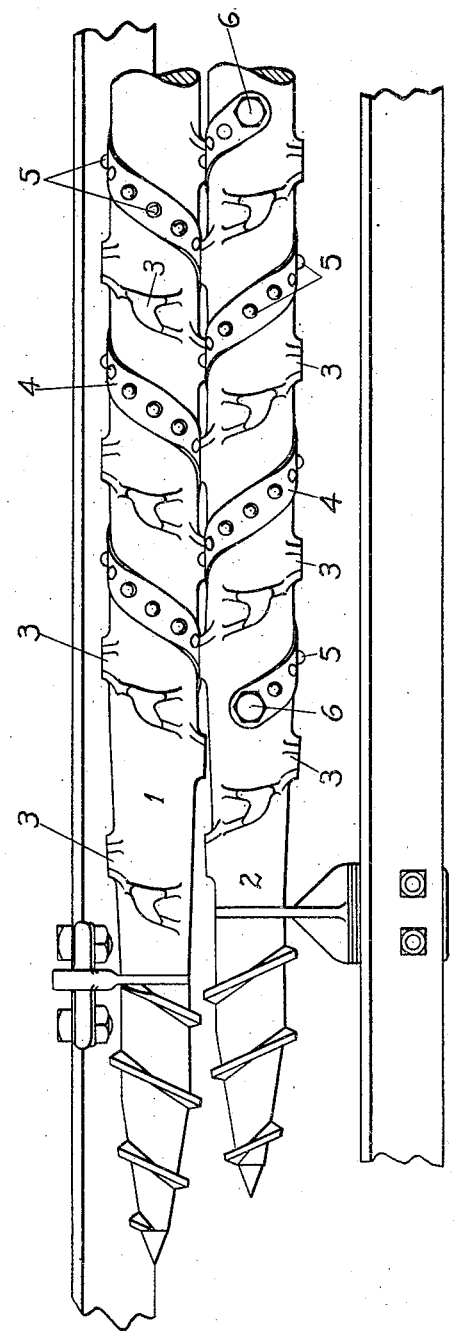
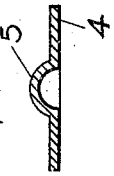
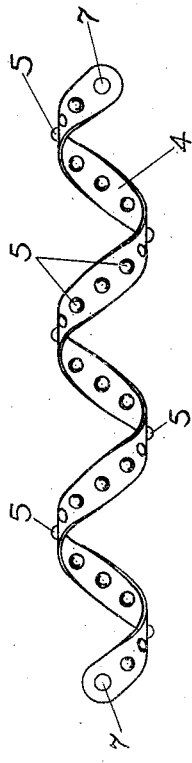
Inventor
John Stadtherr
by W.C. Jirdinstou
Attorney Patented Nov. 10, 1931

1,830,772

UNITED STATES PATENT OFFICE

JOHN STADTHERR, OF GIBBON, MINNESOTA, ASSIGNOR TO DEERE & COMPANY, OF MOLINE, ILLINOIS, A CORPORATION OF ILLINOIS

ATTACHMENT FOR CORN PICKER ROLLS

Application filed February 23, 1927. Serial No. 170,070.

My invention relates to corn pickers, and more particularly to a device which, under certain conditions of a corn crop, is adapted to be applied to picker rolls with the object of preventing trash, such as broken stalks and leaves, from clogging the picker rolls, and operating to force such trash down between the rolls to the ground.

Referring to the drawings in which similar numerals indicate identical parts:

Figure 1 is a plan view of picker rolls with my device applied thereto;

Figure 2 is a view of my device removed from a roll, and

Figure 3 is an enlarged transverse section of my device.

Clean and efficient operation of a corn picker is largely influenced by the condition of the corn. I mean by that that if there is sufficient humidity in the air, stalks and leaves are more readily controlled in the operation of harvesting, the picker rolls alone are fully capable of discharging between them onto the ground leaves, parts of stalks and weeds, if any, but if the plants are thoroughly dry, and consequently brittle, they will be broken by the action of the picker rolls and instead of being carried down onto the ground by the roll action, they will be carried upwardly to the ends of the rolls and collect there in undesirable quantity. This latter trouble or condition I remove by employing my device, which is secured on the rolls 1 and 2, the latter having helically arranged teeth 3 to operate in a manner well known in the art.

My improvement is made of a flexible strip of metal having studs 5, preferably upset on the metal and adapted, by the turn of the rolls, to catch broken trash and weeds and force them down between the rolls to fall to the ground, and also to aid the teeth 3 in removing the husk, particularly when the rolls have become slippery and polished by use. My device, as stated, is made of metal, which can be readily bent into a helical form, as shown in Figure 2, and is readily mounted on a roll, without removing the latter from the picker, by securing one end to a roll and turning the latter until the device is wound on the roll in position consonant with the helical arrangement of the teeth 3, after which the free end is also secured to the roll. By making the pitch of the helical strip greater than twice the width of the strip itself sufficient clearance is provided between the roll teeth and the strip to ensure complete cooperation between the two without danger of clogging. When the condition of the corn is such as to render the use of my device unnecessary, it can be readily removed. This attachment can be manufactured and sold as a separate part, or supplied with the picker upon which it is to be used, whether the rolls are supplied with teeth or are smooth with an uninterrupted surface, for it is readily apparent that my device can be applied to a smooth roll when desired.

What I claim is—

1. The combination of a corn picker roll having permanent helically arranged corn picking means thereon, and an auxiliary helically arranged picking device removably secured on the roll in spaced relation to said means.

2. The combination of a corn picker roll having permanent helically arranged teeth thereon, and an auxiliary helically arranged picking device removably secured on the roll in interthreaded relation to said teeth.

3. The combination of a corn picker roll having permanent helically arranged teeth thereon, and an auxiliary helical picking device removably secured on said roll in spaced relation to said teeth.

4. The combination of a corn picker roll having permanent helically arranged teeth thereon, and an auxiliary picking device comprising a helically formed metallic strip removably secured on said roll in spaced relation to the teeth and having studs on the face thereof arranged at intervals lengthwise of the strip.

JOHN STADTHERR.